Dec. 1, 1931.  W. S. HARLEY  1,834,308
MOTORCYCLE FRONT FORK AND FRONT FORK ASSEMBLY
Filed July 10, 1929  2 Sheets-Sheet 1
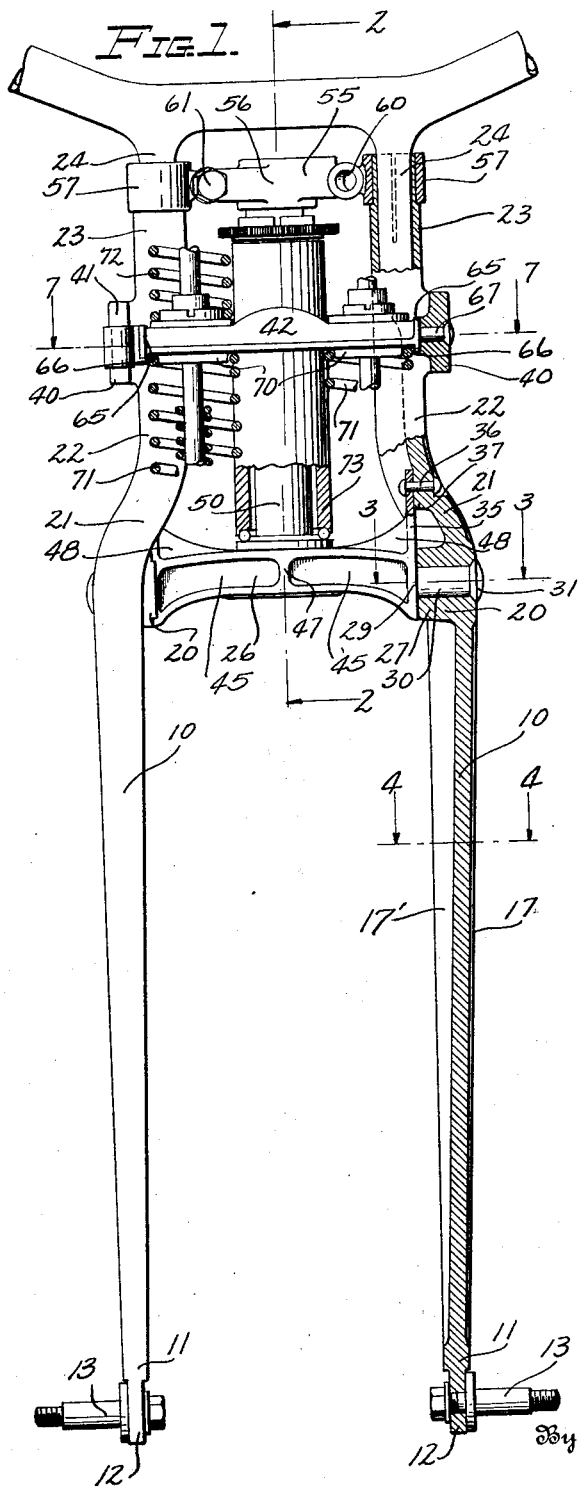
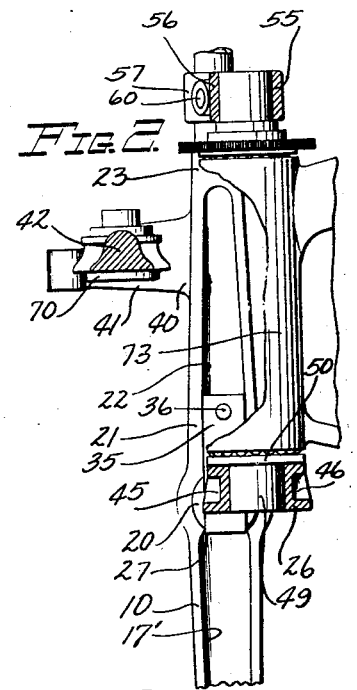
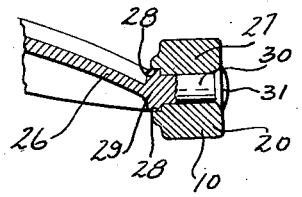
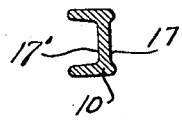
Inventor
William S. Harley
Wheeler, Wheeler & Wheeler
Attorneys Dec. 1, 1931.  W. S. HARLEY  1,834,308
MOTORCYCLE FRONT FORK AND FRONT FORK ASSEMBLY
Filed July 10, 1929  2 Sheets-Sheet 2
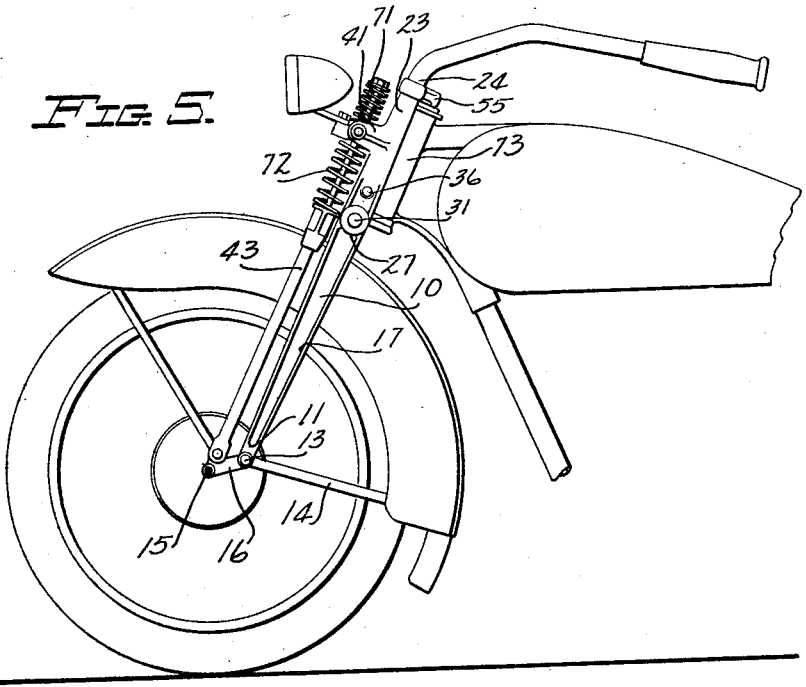
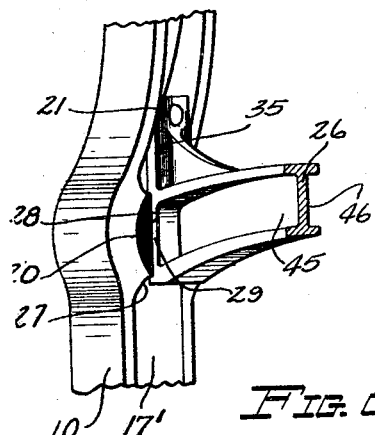
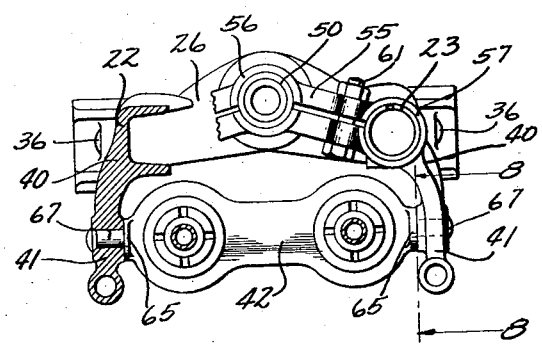
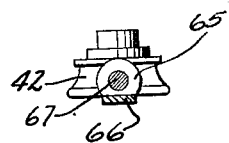
Inventor
William S. Harley
By Wheeler, Wheeler & Wheeler
Attorneys Patented Dec. 1, 1931

1,834,308

UNITED STATES PATENT OFFICE

WILLIAM S. HARLEY, OF MILWAUKEE, WISCONSIN, ASSIGNOR TO HARLEY-DAVIDSON MOTOR COMPANY, OF MILWAUKEE, WISCONSIN, A CORPORATION OF WISCONSIN

MOTOR CYCLE FRONT FORK AND FRONT FORK ASSEMBLY

Application filed July 10, 1929. Serial No. 377,132.

My invention relates to improvements in motorcycle front forks and front fork assemblies.

Broadly speaking, it is my primary object to provide a motorcycle front fork having a greatly increased ratio in strength to weight as compared with existing structures. For many years prior to this invention, it has been the standard practice to assemble front forks by brazing operations because of the permanent nature of the joint made by brazing. This practice, however, has made it necessary to use steel tubing of low carbon content in the manufacture of the component parts of the fork, the low carbon steel being desirable for a good brazing joint and the tubular form of the parts being desirable in order to get adequate strength with this kind of material. Even if it were possible to make a brazed joint in high grade steel, the heat used in brazing would destroy the strength of the steel used. The present invention seeks to overcome existing difficulties in the use of high grade steel by providing a front fork construction which will have the permanence of a brazed fork, while permitting the assembly of the fork from separately manufactured parts.

More particularly stated, it is my object to provide a motorcycle with a front fork composed of non-tubular structural elements, such as forgings, having adequate strength and durability for the heavy duty imposed upon the front forks of motorcycles used for commercial purposes; to provide a form of construction which will be capable of manufacture and assembly at minimum cost; and, in general, to provide a front fork assembly which is peculiarly suited to the requirements of high speed modern motorcycles.

It is also my object to provide a motorcycle front fork structure having parts designed to facilitate forging operations and subsequent assembly and which are capable of being so interlocked as to minimize strain on the means employed to maintain their interlocked relation.

In the drawings:

Figure 1 is a front elevation of a front fork assembly, showing one of the fork arms in longitudinal section, drawn to a plane which includes the axis of the steering head, the latter being partly shown in section.

Figure 2 is a sectional view, drawn generally to line 2—2 of Figure 1, with the steering head shown in full.

Figure 3 is a fragmentary sectional view, taken on line 3—3 of Figure 1.

Figure 4 is a cross section of one of the fork arms, taken on line 4—4 of Figure 1.

Figure 5 is a side elevation of my improved motorcycle front fork assembly and associated parts.

Figure 6 is a fragmentary isometric view showing the interlocking relation of the lower cross head to one of the fork arms.

Figure 7 is a sectional view, taken on line 7—7 of Figure 1, with portions shown in plan.

Figure 8 is a sectional view of the shock absorber cross head, taken on line 8—8 of Figure 7.

Like parts are identified by the same reference characters throughout the several views.

Each fork side comprises a channel shaped arm 10 of solid cross section which is preferably forged to the desired contour with channels 17' and 17 in its inner and outer faces. The latter may comprise merely a shallow depression as best shown in Figure 4.

The arms 10 taper downwardly to unchanneled lower end members 11 having flattened extremities 12 suitably apertured to receive the rocker bolts 13 which connect the lower end of the fork with the wheel axle 15 by links or rocker plates 16 (Figure 5) and also carry mud guard braces 14.

The fork side bars, of which the fork arms 10 form a part, have cross head receiving portions 20, inwardly curving channeled portions 21, and upwardly extending channeled portions 22, terminating in cylindrical portions 23 which are suitably socketed to receive the handle bar posts 24. The sockets may be formed by boring the upper ends of the bars axially. The portions 20 to which the cross head or crown plate 26 is secured,  are shaped to form inwardly extending stud like projections 27. The inner face of each of these projections is provided with a vertical channel 28 in which a portion 29 of the cross head 26 is receivable. The complementary parts of the cross head and fork side arms may be machined if desired, but are not necessarily so treated. Each end portion 29 of the cross head carries a cylindrical stud 30 which is made to fit tightly within a bore formed in the portion 20 of the associated fork bar for that purpose. The outer end of each stud 30 is anchored in the respective fork side bar by some substantial fastening means such as the riveting shown at 31 in Figure 3.

The cross head 26 is also provided at its ends with upwardly extending arms 35 seated on shoulders 37 formed in the channel of the portion 21. The contacting faces of the arms 35 and the shoulders 37 are fitted closely together and preferably, although not necessarily, machined to facilitate an accurate interlocking engagement of the side margins of the arms 35 within the sides of the channels in the arm portions 21. Thereby the arm is held against displacement toward the front or rear and strains which would otherwise be exerted upon the studs 30 are avoided to such a degree that the use of the rivet shown at 36 is merely precautionary. The sides of the channels 28 also relieve the studs 30 from strains exerted in planes parallel to the longitudinal axis of the motorcycle and prevent the cross head 26 from rotating about the axis of its studs.

It will be observed that the portions 20 of the fork side bars are located at the base of the inwardly curving or offsetting portions 21. These portions 20 not only form stud like projections which fill the channels, but the front and rear faces of the bar are each provided with a cylindrically curving bulge, thus heavily reinforcing the bar at the point where the greatest stress is exerted. This also allows the studs 30 to be made large and of adequate strength.

The cross head 26 is separately constructed, preferably by forging. It is arched, the major curvature being in its end portions. Its front and rear faces may be provided with channels 45 and 46 between upper and lower flanges which may, if desired, be reinforced at the center by a vertically extending web 47. Likewise the anchoring arms 35 may be reinforced by bracing webs 48. The channels 45 and 46 of the device illustrated are relatively shallow in the central portion from which steering post 50 rises. Broadly, it is immaterial whether the steering post be made separately or formed integrally with cross head 26. The integral manufacture by forging has advantages in the way of economy. In order, however, to show how the parts may be fastened together if constructed separately, I have illustrated post 50 provided with a reduced end at 49 fitted into an opening in the relatively heavy central part of cross head 26.

The upper end of the steering post 50 is braced by an upper cross head 55 which may be either forged or formed of cast steel. It has a cylindrical central portion 56 which is bored or reamed to receive the reduced upper end of the steering post 50. It also has cylindrical end portions 57 which are bored or reamed to receive the reduced upper extremities of the portions 23 of the fork side bars.

Between the cylindrical portions 56 and 57, the cross head 55 is provided with slots in planes which include the axes of the cylindrical portions, and the upper ends of the fork side portions 23 are also longitudinally slotted, whereby the cross head may be rigidly clamped to the portions 23 and the latter contracted into gripping relation to the handle bar posts or shanks 24. The intermediate or slotted portions of the upper cross head are provided with apertures 60 to receive the clamping bolts 61.

The channeled portions 22 of each fork side bar are provided with an outward projection 40 from which integral bracket like arms 41 extend and support the cross head 42 of the shock absorbing fork 43, this fork being particularly described in my former Patent, No. 1,527,133, dated February 17th, 1925.

The shock absorber cross head or spring saddle 42 of the auxiliary shock absorbing fork 43 may also be separately constructed and is preferably forged. The end portions 65 of the saddle 42 are preferably machined and seated against the inner faces of the arms 40. One side of each end portion is flattened and seated upon a shelf like projection 66 (Figure 8), the contacting faces of the saddle and shelf being also preferably machined. The portions 65 have cylindrical studs 67 which are fitted to holes drilled in the arms 40 and riveted or otherwise rigidly secured to the outer faces of said arms as clearly shown at the right hand in Figure 1.

The intermediate portions of the cross head or saddle 42 are provided with spring seatings 70 for the shock absorber springs 71 and 72. These parts and also the steering head, including the steering post 50 and the bearing sleeve or frame head 73, conform generally to ordinary practice both structurally and functionally, and as these parts are not claimed herein, further description is deemed unnecessary.

By designing my improved fork in such a manner that each side bar and cross head may be separately manufactured in solid cross section by some such method as forging, and by providing integral rivet studs and reinforcing interlocks or interfitting members to connect the cross heads to the side bars, I am able to construct forged forks at a sufficiently low cost of production to compete successfully with the tubular forks so fas as first expense is concerned. By channel forging the members of high strength materials in the manner described, far greater strength is obtained in proportion to weight of material than was possible in the use of brazed tubes and by separately forging the parts and then interfitting them in the manner described such strength is retained in a durable, strong, light structure of a durability many times that of steel tubing of nearly equal weight. The tough or fibrous character of the forged metal is peculiarly adapted to resist crystalizing tendencies, and its strength is such that strains in excess of the normal molecular tension do not develop in a manner to cause crystallization.

Also the specific design disclosed is such that the cross heads effectively co-operate with each other and with the fork side bars, to resist torque and buckling strains. The improved results are due in no small part to the upwardly offset connection of the cross head 26 afforded by the arms 35 and the connection of the cross head 42 to the arms 40 integral with the side bars and with which the cross head 42 is interfitted.

I claim:

1. A motorcycle front fork comprising side bars, a cross head connecting said side bars, means securing said cross head to the side bars, and means rigidly interlocking said cross head with said side bars above said securing means and adapted to prevent material disalignment.

2. A motorcycle front fork comprising forged side bars, a forged cross head connecting said side bars, means permanently connecting said cross head to the side bars and separate means interlocking said cross head against disalignment with respect to said bars.

3. A motorcycle front fork comprising forged side bars, a forged cross head connecting said side bars, means permanently connecting said cross head to the side bars and separate means integral with said cross head and interlocked with the side bars to brace the cross head against disalignment with respect to said bars at points offset from the connecting means both longitudinally and transversely of the bars.

4. A motorcycle front fork composed of channeled side bars and a cross head having stud-like ends secured through the respective bars, and also having means interlocked in the channels at points distant from said ends.

5. A motorcycle front fork composed of bars having channels along their inner faces, in combination with a connecting cross head fastened to the respective bars and having arms extending along the channels of the bars in interlocking engagement therewith.

6. A motorcycle front fork composed of channeled bars provided with cylindrical upper ends, in combination with spaced cross heads connecting said bars, a steering spindle supported by and extending between said heads, one cross head having stud-like ends extending through the respective bars and secured thereto, and arms interacting with the channeled bars at points distant from said stud like projections.

7. A motorcycle front fork composed of channeled bars provided with cylindrical upper ends, in combination with spaced cross heads connecting said bars, a steering spindle supported by and extending between said head, one cross head having stud-like ends extending through the respective bars and secured thereto, and arms interacting with the channeled bars at points distant from said stud like projections, said arms being separately connected to said bars.

8. A motorcycle front fork having side bars channeled intermediate of their ends and provided with stud-like projections on their inner faces, in combination with a fork head having ends interlocked with said stud-like projections and anchored to said bars, and also having arms interlocked in the channels of the side bars.

9. A motorcycle front fork bar comprising an integral solid member, channel forged in its intermediate portion, and provided at its upper end with an axial bore to receive a handle bar post.

10. A motorcycle front fork bar, channel forged in its intermediate portion, said portion having an inwardly curving offset reinforced by an integral body of metal which fills the channel at the base of the offset and forms a stud-like projection adapted to receive a fork head in anchorage relation thereto.

11. A forged motorcycle front fork bar, having an enlarged intermediate portion, formed for interlocking connection with a cross head and also having a cylindrical cross head receiving upper end portion provided with an axial socket to receive a handle bar post.

12. A motorcycle front fork structure comprising the combination of a set of separately formed side bars of solid cross section, provided with integral forwardly projecting arms, upper and lower cross heads connecting said bars, and a third cross head connecting said arms, the cross heads being rigidly secured to said side bars and arms, each in cooperation with the others to resist torque and buckling strains.

13. A motorcycle front fork structure comprising the combination of a set of separately formed side bars of solid cross section, provided with integral forwardly projecting arms, upper and lower cross heads connecting said bars, and a third cross head connecting said arms, the cross heads being rigidly secured to said side bars and arms, each in co-operation with the others to resist torque and buckling strains, said third cross head being offset from the plane of the first two cross heads.

14. A motorcycle front fork structure comprising the combination of a set of separately formed side bars of solid cross section, provided with integral forwardly projecting arms, upper and lower cross heads connecting said bars, and a third cross head connecting said arms, the cross heads being rigidly secured to said side bars and arms, each in co-operation with the others to resist torque and buckling strains, said third cross head being offset from the plane of the first two cross heads, and a steering spindle extending between said first and second cross heads and connected thereto.

15. A motorcycle front fork having two separately formed side bars of solid cross section provided individually with handle bar sockets and connected by a plurality of cross heads of solid cross section, each of said bars having a flange non-rotatably engaging one of said cross heads.

16. A motorcycle front fork having two separately forged side bars connected by a plurality of forged cross heads, each having integral portions interconnected and non-rotatably interlocked with the side bars, and a swivel post connecting said cross heads.

17. A motorcycle front fork comprising a pair of channeled side bars of high strength steel, connected by a plurality of cross heads interfitted with, and permanently connected to the side bars.

18. In a front fork structure, a forged cross head, having at each end an axially projecting rivetable stud and an arm extending substantially perpendicularly to the stud from the base thereof and adapted to interact separately with the member to which the stud is riveted.

WILLIAM S. HARLEY.